United States Patent
Sako (10) Patent No.: US 9,248,979 B2
(45) Date of Patent: Feb. 2, 2016

(54) SHEET CONVEYANCE DEVICE FOR CONVEYING SHEET

(71) Applicant: CANON KABUSHIKI KAISHA, Tokyo (JP)

(72) Inventor: Tadahiro Sako, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/863,688

(22) Filed: Apr. 16, 2013

(65) Prior Publication Data

US 2013/0277172 A1 Oct. 24, 2013

(30) Foreign Application Priority Data

Apr. 23, 2012 (JP) ................................ 2012-098241

(51) Int. Cl.
| | |
|---|---|
| *B65H 9/00* | (2006.01) |
| *B65G 47/24* | (2006.01) |
| *B65H 5/06* | (2006.01) |
| *B65H 7/10* | (2006.01) |
| *B65H 7/14* | (2006.01) |

(52) U.S. Cl.
CPC ............... *B65G 47/24* (2013.01); *B65H 5/062* (2013.01); *B65H 7/10* (2013.01); *B65H 7/14* (2013.01); *B65H 9/004* (2013.01); *B65H 9/006* (2013.01); *B65H 2404/144* (2013.01); *B65H 2404/1424* (2013.01); *B65H 2511/22* (2013.01); *B65H 2513/41* (2013.01); *B65H 2701/1315* (2013.01)

(58) Field of Classification Search
CPC .................................. B65H 7/14; B65H 9/006
See application file for complete search history.

(56) References Cited

U.S. PATENT DOCUMENTS

| | | | | |
|---|---|---|---|---|
| 6,704,523 | B2 * | 3/2004 | Takeuchi ................. | B65H 7/14 250/559.4 |
| 7,675,051 | B2 * | 3/2010 | Ohta ........................ | B65H 7/14 250/205 |
| 7,677,558 | B2 * | 3/2010 | Kinoshita .............. | B65H 9/002 271/227 |
| 7,722,039 | B2 * | 5/2010 | Shoji ........................ | B65H 7/02 271/228 |
| 7,857,308 | B2 * | 12/2010 | Nakazawa ............. | B65H 9/002 271/228 |
| 8,079,589 | B2 * | 12/2011 | Kinoshita .............. | B65H 9/006 271/242 |
| 8,308,158 | B2 * | 11/2012 | Hirota ..................... | B65H 7/08 271/227 |
| 8,382,104 | B2 * | 2/2013 | Yasumoto ................ | B65H 7/06 271/228 |
| 8,393,618 | B2 * | 3/2013 | Nakada .................... | B65H 7/08 271/227 |
| 8,851,469 | B2 * | 10/2014 | Adachi .................... | B65H 7/14 271/227 |

(Continued)

FOREIGN PATENT DOCUMENTS

| | | |
|---|---|---|
| JP | 05-124752 A | 5/1993 |
| JP | 2004-025579 A | 1/2004 |
| JP | 2009-286547 A | 12/2009 |

*Primary Examiner* — Gene Crawford
*Assistant Examiner* — Thomas Randazzo
(74) *Attorney, Agent, or Firm* — Fitzpatrick, Cella, Harper & Scinto (57) ABSTRACT

Side edge position detection processing includes adjustment of the light amount of light-emitting devices, a process of determining a threshold value for detecting the side edge position, and a process of reading out the side edge position. If a sensor is provided between a transfer roller pair and a registration roller pair as in conventional devices, sufficient processing time cannot be ensured. Therefore, the sensor is provided between the conveyance roller pair and the registration roller pair, and the light amount adjustment is executed before the registration roller pair that is being stopped for skew correction is driven. Further, the processes of determining the threshold and reading out the side edge position are executed after driving of the registration roller pair is resumed.

9 Claims, 8 Drawing Sheets

(56) References Cited

U.S. PATENT DOCUMENTS

| | | | |
|---|---|---|---|
| 2008/0251998 A1* | 10/2008 | Muneyasu | B65H 5/34 271/227 |
| 2010/0327519 A1* | 12/2010 | Miyazawa | B65H 5/062 271/248 |
| 2012/0080838 A1* | 4/2012 | Osada | B65H 5/062 271/228 |
| 2012/0153565 A1* | 6/2012 | Deno | B65H 5/38 271/226 |
| 2013/0009358 A1* | 1/2013 | Deno | B65H 7/08 271/227 |

* cited by examiner

SHEET CONVEYANCE DEVICE FOR CONVEYING SHEET

BACKGROUND OF THE INVENTION

1. Field of the Invention

The present invention relates to sheet conveyance devices for conveying sheets.

2. Description of the Related Art

Image forming apparatuses control conveyance of recording material and image formation processing so as to form an image at a predetermined position on the recording material. If the recording material is conveyed obliquely relative to a conveyance direction (skew) or conveyed in a state of being misaligned in a direction (lateral direction) perpendicular to the conveyance direction (lateral position error), the image is not formed at the predetermined position. U.S. Pat. No. 8,079,589 proposes a skew correction mechanism for correcting skew of recording material. Also, Japanese Patent Laid-Open No. 05-124752 proposes a correction mechanism for correcting lateral position error (lateral registration correction mechanism). Particularly, Japanese Patent Laid-Open No. 05-124752 proposes an invention that detects the position of a side edge of recording material using a line sensor provided on a conveyance path and shifts rollers in the lateral direction so that the side edge position is aligned with a predetermined position. Here, the "side edge" means a side of the recording material that is parallel to the conveyance direction, among four sides thereof.

To accurately align the side edge position with the predetermined positions, it is important to accurately detect the side edge position. Japanese Patent Laid-Open No. 2004-25579 describes an invention that detects the side edge position by detecting that the level of an output signal from a comparator changed from an output level of reflected light from the surface of recording material to an output level of reflected light from a black conveyance guide.

According to Japanese Patent Laid-Open No. 2004-25579, a position detection sensor is provided between a registration roller and a photosensitive drum on a conveyance path. An advantage of providing the position detection sensor at this position is that position detection can be executed for recording material after a flexure thereof formed due to skew correction is resolved and the recording material returns to being substantially flat. If the position detection is executed on recording material with a flexure, a detection error occurs because the distance from the position detection sensor to the surface of the recording material is not a same value.

Thus, the invention described in Japanese Patent Laid-Open No. 2004-25579 is advantageous regarding the accuracy of the side edge position detection, but the time taken from the detection to toner image transfer is significantly short because the side edge position is detected immediately before the photosensitive drum that transfers a toner image. Moreover, recording material is conveyed without stopping in a zone from the registration roller to the photosensitive drum, and therefore, this time needs to be set short still further. Meanwhile, side edge position detection processing includes adjustment of the light amount of a light source for irradiating recording material with light, determination of a threshold value for detecting the side edge position, detection of the side edge position, and determination of the shift amount of the registration roller for correcting the side edge position. Recording material conveyance speed is becoming higher in recent years, and it is therefore very difficult to execute the aforementioned processes in such a short time.

As a result, the inventor of the present application thought that a longer detection time can be ensured by arranging a sensor for detecting the side edge position between the registration roller and a conveyance roller that is located on the upstream side of the registration roller in the conveyance direction. In this case, the leading edge of the recording material abuts the registration roller and skew is corrected, and thereafter, the flexure is resolved by rotating the registration roller and returning the recording material to being flat, and the side edge position of the recording material that is being conveyed is detected. Here, if the length of the recording material in the conveyance direction is long, the time taken to pass through the detection position of the sensor becomes long, and the detection time can be thus ensured. However, in the case of recording material of the smallest conveyable size for the conveyance device, such as a postcard or a business card, the time taken to pass through the detection position of the sensor inevitably becomes short. Note that the smallest conveyable size depends on the distance between the registration roller and the conveyance roller that is located upstream of the registration roller. As mentioned above, in order to improve the accuracy of the side edge position detection, the detection can be executed after the flexure is resolved. However, in the case of recording material whose length in the conveyance direction is short, sufficient detection time cannot be ensured because the time taken to pass through the detection position after the flexure is resolved is too short.

SUMMARY OF THE INVENTION

The present invention detects the side edge position of recording material even if the recording material conveyance speed is raised and the recording material size becomes smaller.

An embodiment of the present invention provides a sheet conveyance device comprising the following element. A first conveyance roller pair is configured to convey a sheet on a conveyance path and is constituted by two conveyance rollers that can be separated from each other. A first drive unit is configured to cause the two conveyance rollers constituting the first conveyance roller pair to separate from and abut each other. A second conveyance roller pair is arranged on a downstream side of the first conveyance roller pair in a conveyance direction of the sheet and corrects skew of the sheet. A second drive unit is configured to move the second conveyance roller pair in a lateral direction that is perpendicular to the conveyance direction. A position detection unit includes a plurality of light-emitting devices that emit light and a plurality of light-receiving devices that receive light. The position detection unit further detects a position of a side edge of the sheet in the lateral direction on the conveyance path between the first conveyance roller pair and the second conveyance roller pair. An adjustment unit is configured to adjust a light amount of the light-emitting devices so that a level of a signal output by the light-receiving devices is constant. A control unit is configured to, after the adjustment unit adjusts the light amount of the light-emitting devices, control the first drive unit so as to separate the two conveyance rollers constituting the first conveyance roller pair from each other in a state where the second conveyance roller pair is nipping the sheet, cause the position detection unit to detect the position of the side edge of the sheet after the first drive unit separates the two conveyance rollers from each other, and control the second drive unit so as to move the second conveyance roller pair in accordance with the position of the side edge detected by the position detection unit.

Further features of the present invention will become apparent from the following description of exemplary embodiments (with reference to the attached drawings).

DESCRIPTION OF THE EMBODIMENTS

Hereinafter, an embodiment of the present invention will be described as examples in detail with reference to the drawings. However, regarding dimensions, materials, shapes, relative arrangement, and the like of the components described in the embodiment, the scope of the invention is not intended to be limited thereto, unless otherwise stated specifically.

First Embodiment

Figure 1:
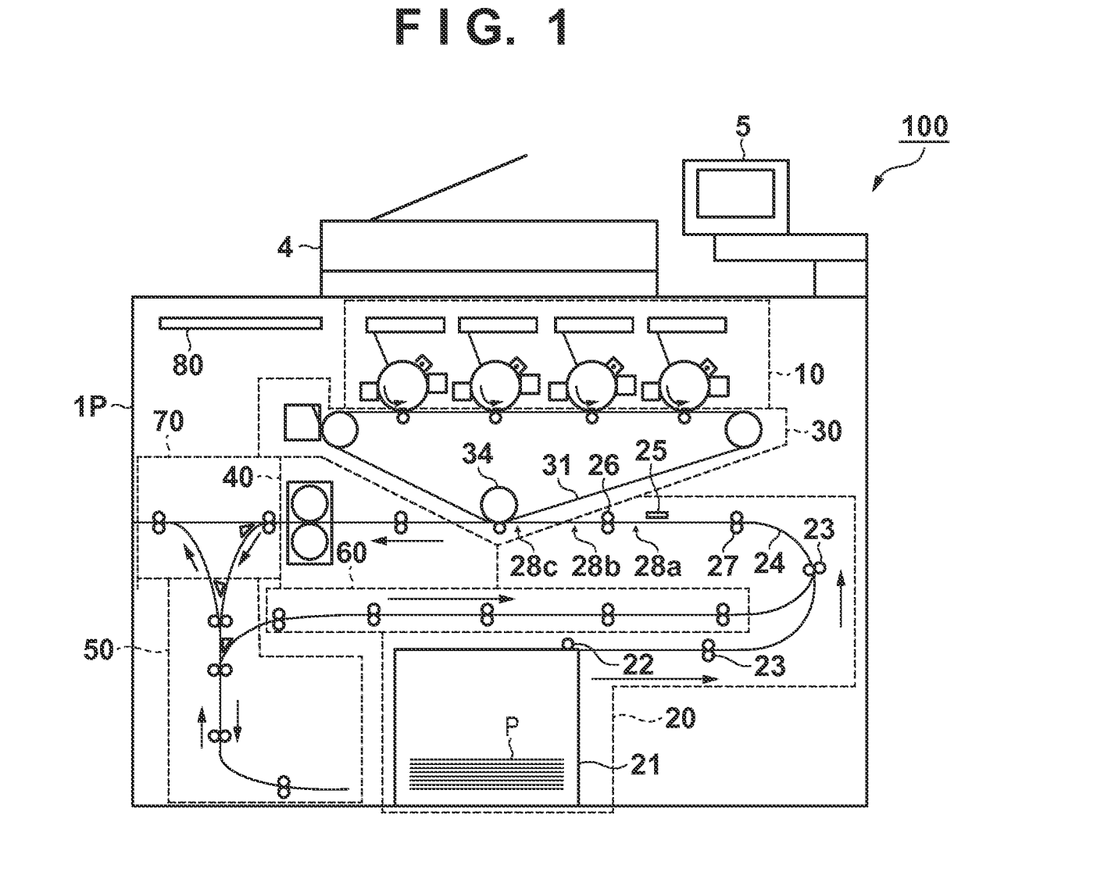
FIG. 1 is a cross-sectional view of an image forming apparatus.

In FIG. 1, an image forming apparatus 100 includes a recording material conveyance device having a position detection device of the present invention. Although a recording material conveyance device for the image forming apparatus 100 will be described here as the recording material conveyance device, the present invention is applicable to any conveyance devices that need to detect the side edge position of recording material. Although an electrophotographic copy machine is employed as an example of the image forming apparatus 100, the present invention is also applicable to printers and facsimiles that form monochrome or color images. Note that the recording material may also be referred to as sheet material, transfer material, transfer paper, or print paper.

An image output unit 1P is a printer engine unit for forming an image of an original obtained by a reader unit 4 on recording material P in accordance with an instruction that is input from an operation unit 5. The image output unit 1P includes an image forming unit 10 for forming a toner image, a conveyance unit 20 for feeding the recording material P from a feed cassette 21 to a conveyance path, an intermediate transfer unit 30 for transferring the toner image onto the recording material P, and a fixing unit 40 for fixing the toner image on the recording material P. Note that the image output unit 1P may optionally include a duplex inversion unit 50 for inverting front and back faces of the recording material P to perform duplex printing on the recording material P and a duplex conveyance unit 60 for conveying the recording material P whose front and back faces were inverted, in order to execute duplex printing on the recording material P. The image output unit 1P further includes a discharge unit 70 for discharging the recording material P, and a control device 80. The control device 80 is a unit for controlling the operation of each unit included in the image forming apparatus 100.

The conveyance unit 20 is a recording material conveyance device for conveying the recording material P. The recording material P contained in the feed cassette 21 is sent out sheet-by-sheet to the conveyance path by a pickup roller 22. The conveyance path is constituted by a black conveyance guide 24 whose optical density is lower than that of the recording material P. A plurality of conveyance roller pairs 23 for nipping and conveying the recording material P are provided on the conveyance path. A registration roller pair 26 is a roller pair for conveying the recording material in accordance with the timing of toner image transfer. The registration roller pair 26 has the aforementioned skew correction function and lateral registration correction function. Skew of the recording material P is corrected by the leading edge of the recording material P abutting the registration roller pair 26 whose rotation is stopped. In other words, two side edges (lateral sides) of the recording material P are set parallel to the conveyance direction. Note that in some cases the leading edge of the recording material P in the conveyance direction is also referred to as an upper edge, and the trailing edge thereof in the conveyance direction is also referred to as a lower edge. In other words, four sides that constitute the rectangular recording material P are the upper edge (upper side/leading edge), the lower edge (lower side/trailing edge), and two side edges (left side, right side). The side edge position of the recording material P is corrected to a predetermined position as a result of the registration roller pair 26 moving parallel to the lateral direction (a direction perpendicular to the conveyance direction) while nipping the recording material P.

Between the conveyance roller pairs 23 and the registration roller pair 26 on the conveyance path, a conveyance roller pair 27 that is opened and closed, a plurality of sheet sensors 28 for detecting the presence of the recording material P on the conveyance path, and a line sensor 25 for detecting the side edge position of the recording material P are provided. Among the sheet sensors 28, a sheet sensor located between the conveyance roller pair 27 and the registration roller pair 26 will be referred to as a first registration sensor 28a. Two sheet sensors located between the registration roller pair 26 and a transfer roller pair 34 will be referred to as a second registration sensor 28b and a transfer sensor 28c, respectively.

The line sensor 25 is an example of a light detection unit in which a plurality of devices each having a plurality of reading pixels are arrayed in line and that detects reflected light or transmitted light from the recording material P. The conveyance roller pair 27 is closed to nip the recording material P when conveying the recording material P. When correcting the side edge position of the recording material P, the conveyance roller pair 27 is opened and the recording material P is thereby released from the conveyance roller pair 27.

The intermediate transfer unit 30 includes an intermediate transfer belt 31 for conveying the toner image and a transfer roller pair 34 for transferring the toner image onto the recording material P. The transfer roller pair 34 is constituted by two rollers, and the intermediate transfer belt 31 and the recording material P are nipped by these two rollers.

The fixing unit 40 is a unit for fixing, on the recording material P, the toner image that was transferred onto the recording material P. The discharge unit 70 is a unit for discharging the recording material P on which the toner image was fixed to the outside of the image forming apparatus 100. The duplex inversion unit 50 is a unit for drawing in the recording material P having the image formed on its surface and sending it to the duplex conveyance unit 60, thereby inverting front and back faces of the recording material P. The duplex conveyance unit 60 is a unit for conveying the recording material P to the aforementioned conveyance path. The skew correction and lateral registration correction are also executed on the recording material P that was conveyed by the duplex conveyance unit 60.

Figure 2A:
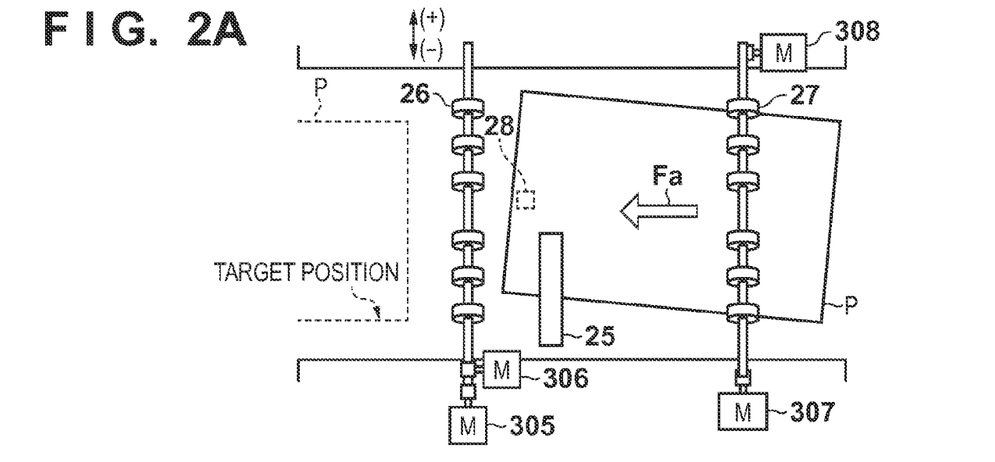
FIGS. 2A, 2B and 2C are diagrams illustrating skew correction and lateral registration correction.
Figure 2B:
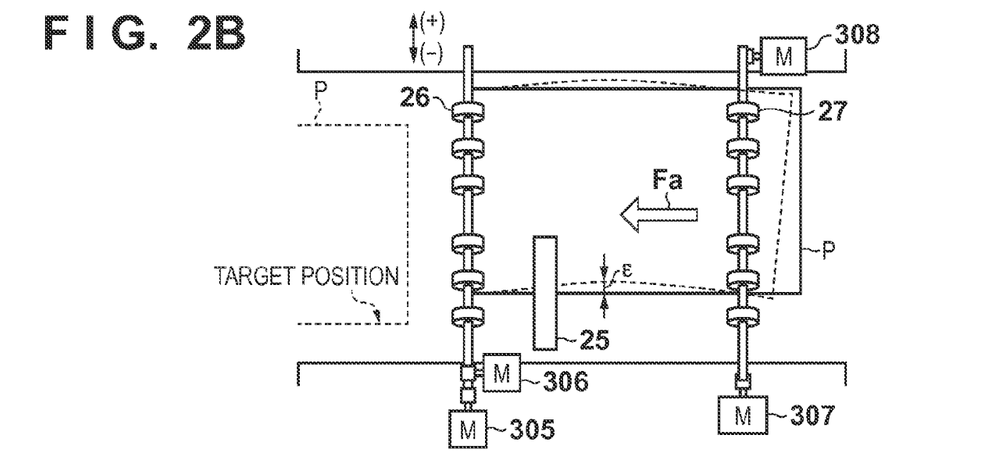

The skew correction and lateral registration correction will be discussed in detail using FIGS. 2A to 2C. In FIG. 2A, the registration roller pair 26 rotates by being driven by a registration drive motor 305. Also, the registration roller pair 26 moves parallel to a lateral direction Fb that is perpendicular to a conveyance direction Fa by being driven by a shift motor 306. The conveyance roller pair 27 rotates by being driven by a drive motor 307. The two rollers that constitute the conveyance roller pair 27 are closed and opened by being driven by an open/close motor 308. To open the conveyance roller pair 27 may also be referred to as "to release" or "to separate". To close the conveyance roller pair 27 may also be referred to as "to abut".

As shown in FIG. 2A, the recording material P is conveyed on the conveyance path by the rotation of the conveyance roller pair 27. When the recording material P arrives at the registration roller pair 26, the registration roller pair 26 is stopped. The conveyance roller pair 27 continues to rotate after the recording material P abuts the registration roller pair 26 that is stopped, and thus, the recording material P is flexed as shown by broken lines in FIG. 2B. If the line sensor 25 detects the side edge position of the flexed recording material P, an error 6 occurs as shown in FIG. 2B. Therefore, side edge position detection is executed in a state where the recording material P is returned to being substantially flat.

In a state where the recording material P is flexed, the leading edge of the recording material P abuts the registration roller pair 26, while being pressed in the conveyance direction Fa due to stiffness (rigidity) of the flexed recording material P. As a result, skew of the recording material P is corrected at the leading edge (front edge) of the recording material P. Meanwhile, as shown in FIG. 2B, the trailing edge of the recording material P remains nipped by the conveyance roller pair 27, and remains skewed. If the conveyance roller pair 27 is separated in this state, no roller pairs nip the recording material P. Accordingly, the registration roller pair 26 is rotated before the conveyance roller pair 27 is separated. After the registration roller pair 26 nips the recording material P, the conveyance roller pair 27 is separated. As shown in FIG. 2C, skew of the entire recording material P is corrected upon the conveyance roller pair 27 being separated.

Figure 2C:
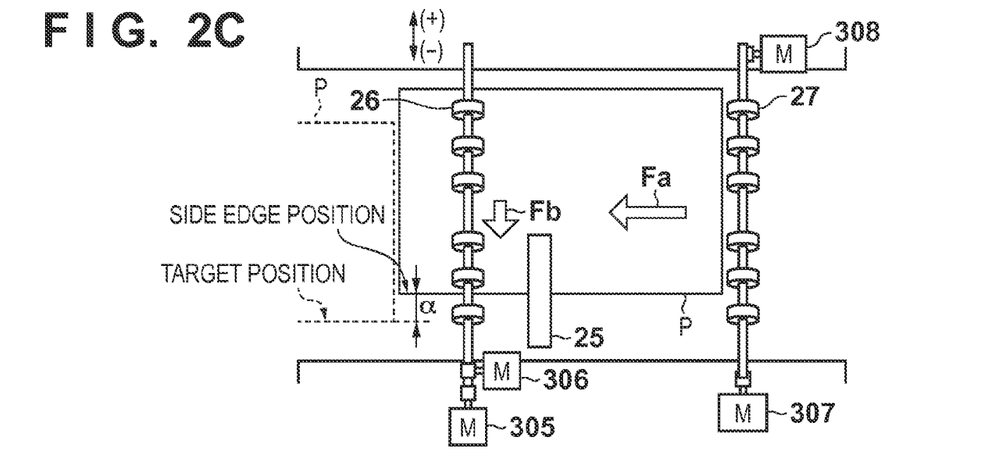

As shown in FIG. 2C, the side edge position of the recording material P is detected by the line sensor 25 in a state where skew of the recording material P was corrected. The longitudinal direction of the line sensor 25 is perpendicular to the conveyance direction Fa. By detecting the side edge position of the recording material P by the line sensor 25, an amount α of misalignment of the side edge position relative to a target position is found. Then, the registration roller pair 26 moves parallel to the lateral direction Fb so that the misalignment amount becomes zero. Note that as shown in FIGS. 2A to 2C, the directions in which the registration roller pair 26 shifts in the lateral registration correction are indicated by + and −. The + direction is a rightward direction when the downstream side in the conveyance direction of the recording material P is viewed from the upstream side. The − direction is a leftward direction when the downstream side in the conveyance direction of the recording material P is viewed from the upstream side.

Figure 3A:
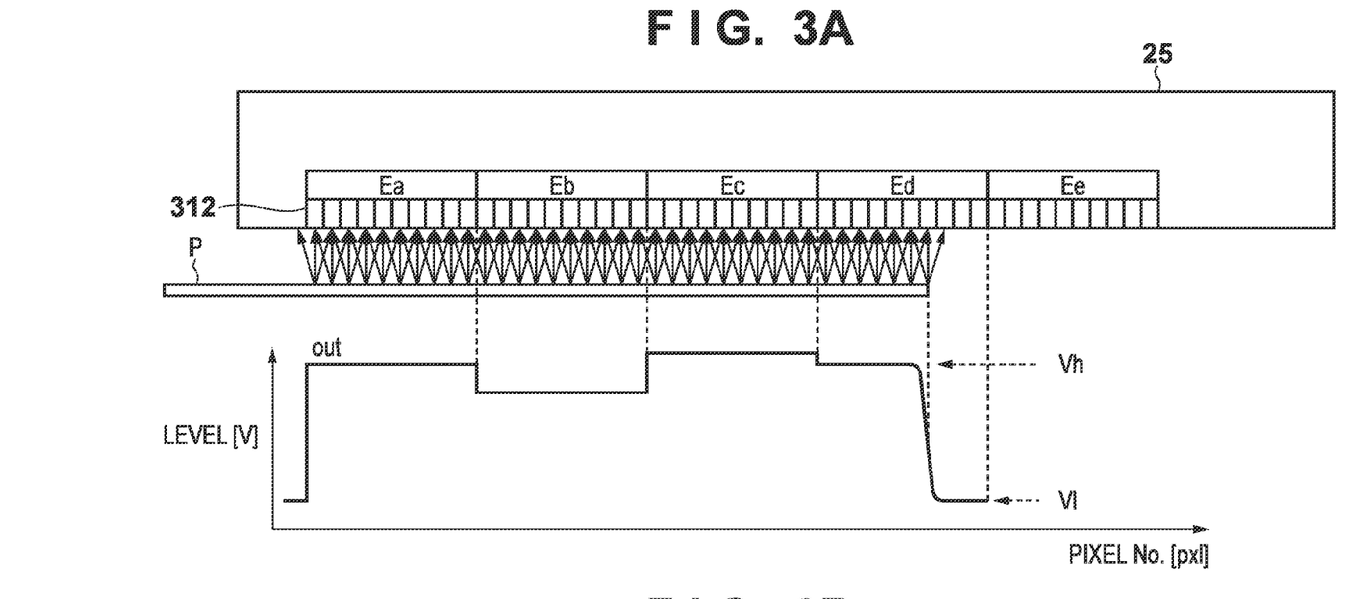
FIGS. 3A and 3B are diagrams illustrating light amount adjustment.
Figure 3B:
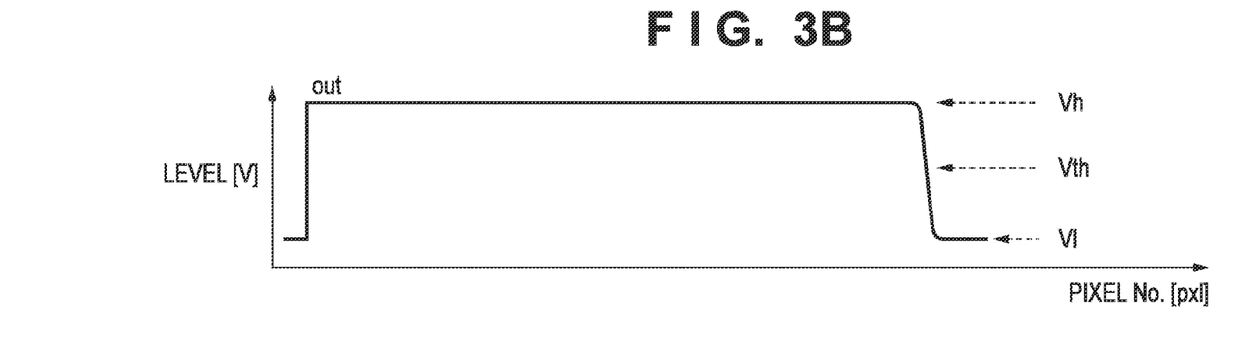

A description will be given, using FIGS. 3A and 3B, of the relationship between the recording material P and the line sensor 25 when the upstream side of the recording material P is viewed from the downstream side, and the level of an output signal OUT that is output from the line sensor 25. The vertical axis of the graph showing the level of the output signal OUT indicates voltage, and the horizontal axis indicates the number of pixels included in the line sensor 25. The pixel number of the leftmost pixel is assumed to be 1. The line sensor 25 outputs voltage of each pixel as an output signal OUT in time-series, and therefore, the horizontal axis also corresponds to time.

The line sensor 25 is constituted by a plurality of device blocks Ea to Ee. Each of the device blocks Ea to Ee has a plurality of reading pixels. Each pixel is a light-receiving device (photoelectric conversion device). The pixel number is given so as to increase from the left end to the right end in FIG. 3A. Light from the light-emitting device (light source), such as an LED, is reflected by the recording material P or the conveyance guide 24, and enters the line sensor 25. The reflected light from the recording material P or the conveyance guide 24 is guided to each pixel in the line sensor 25 by a SELFOC® lens array 312, which is an imaging lens. Surrounding scattered light as well as the reflected light from directly below enter each SELFOC lens that constitutes the SELFOC lens array 312. The recording material P is conveyed toward the viewer in FIG. 3. Note that the light reflectance of the conveyance guide 24 is smaller than the light reflectance of general white recording material.

Here, it is assumed in FIG. 3A that the side edge of the recording material P is passing below a device block Ed. In FIG. 3A, as indicated in the graph of the pixel number [pxl] relative to the level [V], the signal level of a device block under which the recording material P is present is high. On the other hand, the signal level of the device block under which the recording material P is not present is low.

Here, the sensitivities of the device blocks Ea to Ee vary. Therefore, even if uniform reflected light is received from the recording material P whose surface reflection characteristic is uniform, the output levels of the device blocks Ea to Ee vary. According to FIG. 3A, the highest values of the output levels of the device blocks Ea to Ee vary. Of the output level of the device block Ed that is arranged at the position corresponding to the side edge position, the highest value and the lowest value are Vh and Vl, respectively. Such variation in the level among the devices occurs due to manufacturing variation or the like of a semiconductor wafer out of which the devices are cut.

A threshold value Vth for detecting the side edge position can be a median value between the highest value Vh and the lowest value Vl. However, if the highest values Vh of the device blocks Ea to Ee vary, the accuracy of the threshold value determination decreases, and the accuracy of the side edge position detection also decreases. Particularly, if the output level saturates at part of the device blocks, namely the device block Ee, the accuracy of the side edge position detection significantly decreases. Meanwhile, a plurality of LEDs are provided in the line sensor 25. Therefore, as shown in FIG. 3B, the highest value Vh of the output levels of the device block that actually detects the side edge position among the device blocks Ea to Ee is set to a certain constant value by adjusting the amount of light of the LEDs. Thereby, the threshold value accuracy improves. Thus, a CPU 301 functions as an adjustment unit for adjusting the light amount of the light-emitting devices so that the level of the signals is constant that are output by the light-emitting devices when the light-emitting devices received the light reflected by the recording material. That is, each level of the signals becomes a same level.

Figure 4:
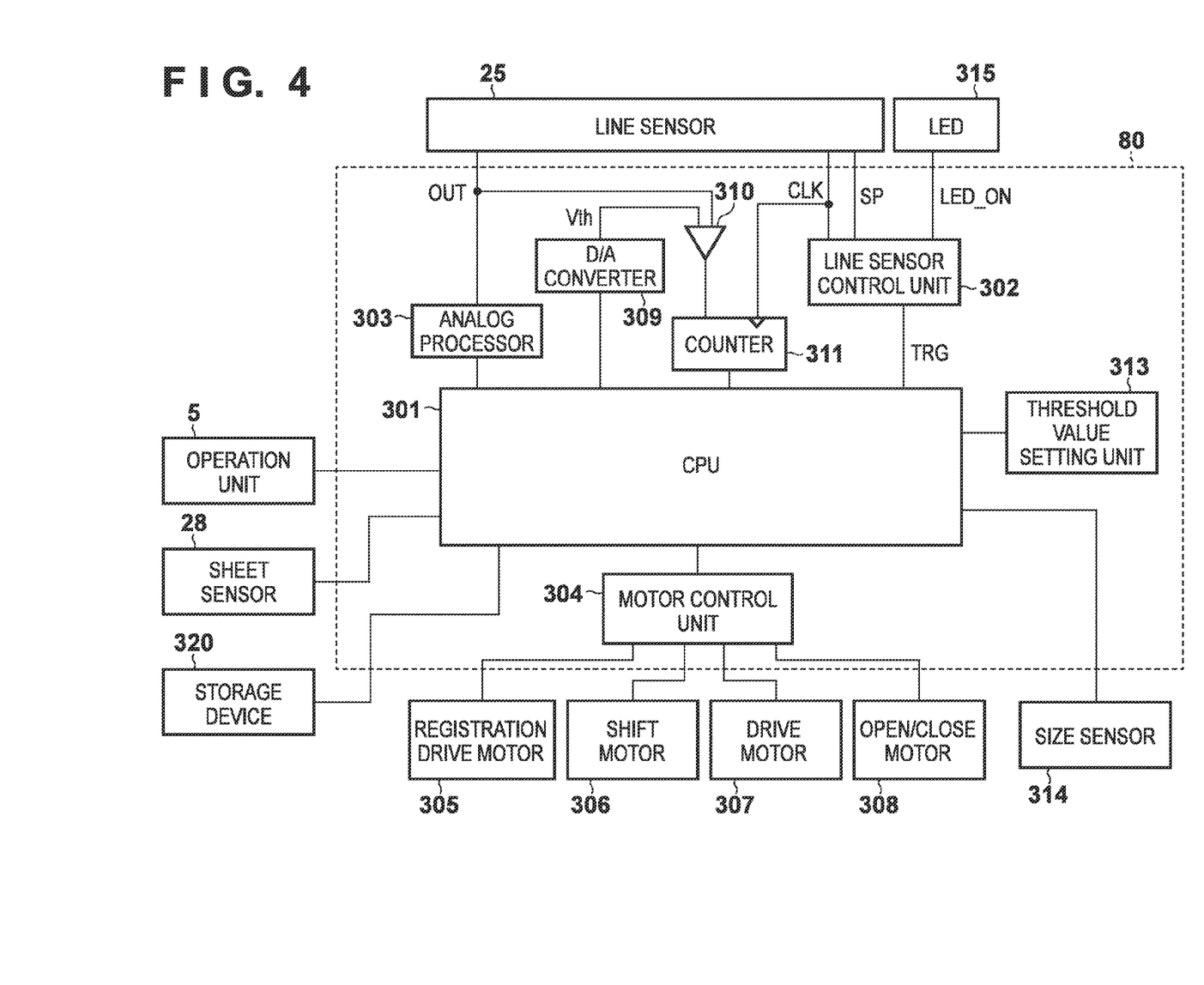
FIG. 4 is a block diagram showing a control unit.

The operation of units involved with the skew correction and lateral registration correction will be discussed using FIG. 4. The CPU 301 obtains an instruction from an input device in an operation unit 5, and displays information on a display device in the operation unit 5. The CPU 301 obtains size information that indicates the size (e.g., A4, A4R, postcard, business card, or a specific length in the conveyance direction) of the recording material P from the operation unit 5 or a size sensor 314. Thus, the size information need only be information indicating the length of the recording material P in the conveyance direction. The size sensor 314 is provided on the conveyance path or in the feed cassette 21, and detects the size of the recording material P. Upon the sheet sensor 28 outputting a detection signal, the CPU 301 recognizes that the leading edge of the recording material P arrived at the sheet sensor 28. The CPU 301 stops the rotation of the drive motor 307 and starts the skew correction and lateral registration correction, based on the time when the leading edge of the recording material P arrived at the sheet sensor 28.

The CPU 301 controls, via a motor control unit 304, the drive motor 307 for rotating the conveyance roller pair 27, as well as the open/close motor 308 for opening the conveyance roller pair 27 when the registration roller pair 26 is shifted. The CPU 301 specifies a shift amount (distance a) for the lateral registration correction, and resumes the rotation of the registration drive motor 305 via the motor control unit 304 at the timing of resuming rotation of the registration roller pair 26. The CPU 301 also drives the shift motor 306 via the motor control unit 304 so that the recording material P moves in the lateral direction by the distance a.

The CPU 301 uses an LED 315 and the line sensor 25 to specify the side edge position of the recording material P. In other words, the LED 315 and the line sensor 25 respectively have a plurality of light-emitting devices for emitting light and a plurality of light-receiving devices for receiving light, and function as a position detection unit for detecting the side edge position of the recording material in the lateral direction on the conveyance path between the conveyance roller pair 27 and the registration roller pair 26. A plurality of light-emitting devices are provided in association with the device blocks Ea to Ee.

The CPU 301, when driving the line sensor 25, outputs a trigger signal TRG to a line sensor control unit 302. The line sensor control unit 302, upon receiving input of the trigger signal TRG, outputs a control signal that is necessary for driving the line sensor 25 to the line sensor 25. The control signals include a clock signal CLK, a start pulse SP, an LED-on signal LED_ON for lighting the LED 315 that accompanies the line sensor, and so on. The line sensor 25, upon receiving input of the clock signal CLK and the start pulse SP, sequentially reads out the signals output from the respective pixels that constitute the device blocks Ea to Ee, and outputs a time-series output signal OUT. The output signal OUT is an analog signal, and is input to an analog processor 303 and a comparator 310. The analog processor 303 converts the output signal OUT from an analog signal into a digital signal, and outputs it to the CPU 301. The CPU 301 determines the timing of executing the light amount adjustment on the LED 315, based on the size information obtained from the size sensor 314 or the operation unit 5. The CPU 301 also compares the levels of the output signals OUT from the device blocks Ea to Ee, identifies the device blocks that are receiving the reflected light from the recording material P, and adjusts the light amount of the LED 315 so that the output signal level corresponding to the reflected light from the recording material P becomes a certain constant level in each device block. Note that this constant level is a level at which the output signal of each light-receiving device block is not saturated. The LED 315, which is constituted by the plurality of LEDs, adjusts driving current for each of these LEDs, and the output signal level becomes thereby a constant level.

After finishing the light amount adjustment, the CPU 301 outputs the output signals from the device blocks Ea to Ee to a threshold value setting unit 313. The threshold value setting unit 313 compares the output signal levels, determines the highest value Vh and the lowest value Vl, determines a median value between the highest value and the lowest value as a threshold value Vth, and outputs it to the CPU 301. The threshold value setting unit 313 may be incorporated in the CPU 301, or may be a function that is implemented by the CPU 301 executing a program stored in a storage device 320. The CPU 301 outputs the threshold value Vth to a D/A converter 309. The D/A converter 309 outputs voltage corresponding to the threshold value Vth to the comparator 310. The comparator 310 compares the threshold value Vth with the output signal OUT, thereby performing binarization.

Thus, the comparator 310 functions as a binarization unit for binarizing the signals output by the pixels that constitute each device block included in the line sensor 25 by comparing these signals with the threshold value determined by the threshold value setting unit 313. If the output signal OUT exceeds the threshold value Vth, the comparator 310 outputs a high-level signal, and if not, the comparator 310 outputs a low-level signal. A counter 311 is operated by the clock signal CLK that is output by the line sensor control unit 302. The counter 311 counts the time period during which the binary signal is at a high level and outputs the counted value to the CPU 301, in accordance with the clock signal CLK. The CPU 301 specifies the side edge position of the recording material P based on the counted value. The CPU 301 also calculates the misalignment amount and the misalignment direction of the side edge position relative to the target position. The CPU 301 converts the misalignment amount into the number of pulses of the shift motor 306, and outputs, to the motor control unit 304, the pulse number and data regarding the driving direction in which the shift motor 306 is driven. The motor control unit 304 drives the shift motor 306 in accordance with the driving direction and the pulse number. Thus, the motor control unit 304, the shift motor 306, and the registration drive motor 305 function as a drive unit for separating the two conveyance rollers constituting the conveyance roller pair 27 and starting driving of the registration roller pair 26 after the adjustment unit adjusts the light amount of the light-emitting devices.

Timing of Light Amount Adjustment

As described above, the side edge position detection processing includes three processes, namely the light amount adjustment, the threshold value determination, and the side edge position reading. Accordingly, to execute these processes, a certain period of processing time needs to be ensured. If the line sensor 25 and the LED 315 are disposed between the registration roller pair 26 and the transfer roller pair 34 as in conventional devices, sufficient processing time for performing the side edge detection cannot be ensured. Therefore, by disposing the line sensor 25 and the LED 315 between the registration roller pair 26 and the conveyance roller pair 27 and executing some of the processes in the side edge position detection processing at an earlier stage, the lateral registration correction can be complete by the time the leading edge of the recording material P arrives at the transfer roller pair 34.

Figure 5A:
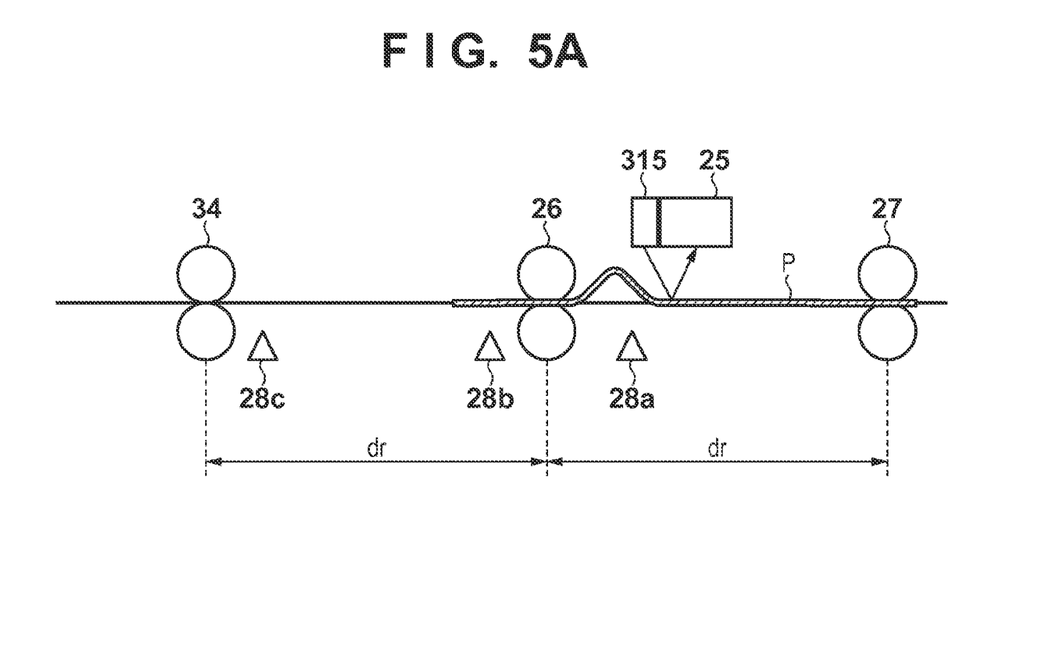
FIGS. 5A and 5B are diagrams illustrating light amount adjustment, threshold value determination, side edge position detection, and a timing of shifting a registration roller pair.
Figure 5B:
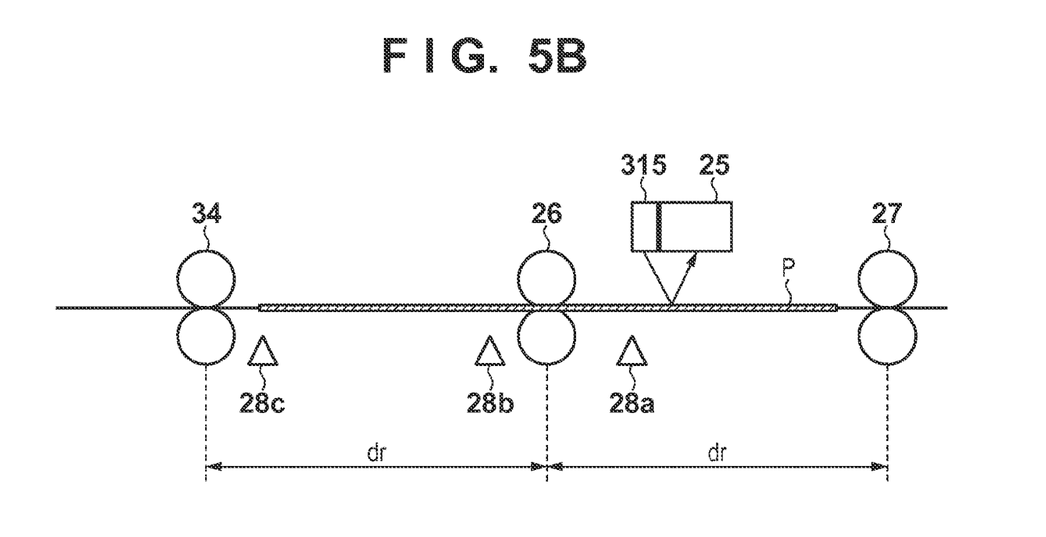

FIG. 5A shows the timing of executing the light amount adjustment. FIG. 5B shows the timing of executing the threshold value determination, the side edge position detection, and the lateral registration correction. As shown in FIG. 5A, the conveyance roller pair 27 is a conveyance roller pair for conveying the recording material on the conveyance path, and is an example of a first conveyance roller pair having two conveyance rollers capable of being separated from each other. The registration roller pair 26 is an example of a second conveyance roller pair that is arranged on the downstream side of the first conveyance roller pair in the recording material conveyance direction and that corrects skew of the recording material.

As shown in FIG. 5A, the CPU 301 executes the light amount adjustment on the LED 315 in a state where the leading edge of the recording material P was detected by the second registration sensor 28b and driving of the registration drive motor 305 is stopped. In the present embodiment, the light amount adjustment can be executed using the recording material P in a state where a toner image is not transferred thereon, and therefore, there is an advantage that a white reference board for the light amount adjustment can be omitted. After the light amount adjustment is complete, the CPU 301 separates the conveyance roller pair 27 and resumes driving of the registration roller pair 26. Skew of the recording material P is thereby corrected.

As shown in FIG. 5B, the CPU 301 executes the threshold value determination, the side edge position detection, and the lateral registration correction before the leading edge of the recording material P arrives at the transfer sensor 28c and by the time when the trailing edge of the recording material P finishes passing through the detection position of the line sensor 25. This is because, if the recording material P arrives at the transfer roller pair 34 before the lateral registration correction is complete, the toner image is transferred at a position that is misaligned from the target position on the recording material P.

Figure 6:
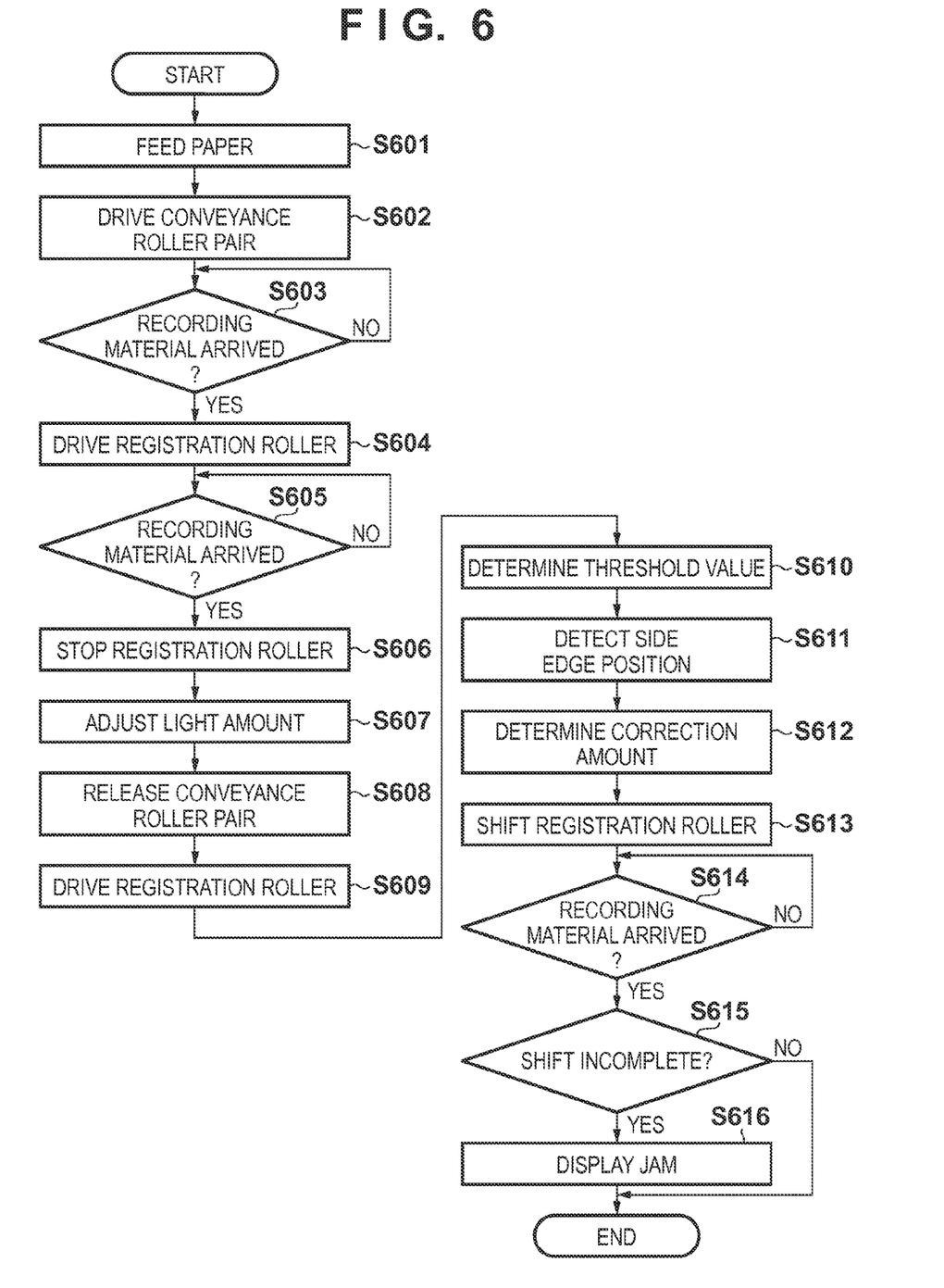
FIG. 6 is a flowchart showing lateral registration correction.

The lateral registration correction executed by the CPU 301 will be discussed using FIG. 6.

In step S601, the CPU 301 gives an instruction to start the rotation of the pickup roller 22 and the conveyance roller pair 23 to the motor control unit 304, thereby feeding the recording material P to the conveyance path.

In step S602, the CPU 301 gives an instruction to start the rotation of the conveyance roller pair 27 to the motor control unit 304.

In step S603, the CPU 301 determines whether or not a predetermined time period elapsed after the leading edge of the recording material P arrives at the first registration sensor 28a, based on a detection signal output by the first registration sensor 28a. If the predetermined time period has not elapsed, the CPU 301 continues to wait. On the other hand, if the predetermined time period elapsed, the CPU 301 proceeds to step S604. Because the leading edge of the recording material P abuts the registration roller pair 26 that is stopped and the recording material P is being conveyed by the conveyance roller pair 27, a flexure occurs in the recording material P toward its leading edge side, and skew of the recording material P around its leading edge is corrected. The aforementioned predetermined time period is set to a time period that is sufficient to correct skew.

In step S604, the CPU 301 gives an instruction to start the rotation of the registration roller pair 26 to the motor control unit 304. The motor control unit 304 starts driving the registration drive motor 305 in accordance with this instruction. Thus, a portion of the recording material P near the leading edge thereof is nipped by the registration roller pair 26.

In step S605, the CPU 301 determines whether or not the leading edge of the recording material P arrived at the second registration sensor 28b, based on a detection signal output by the second registration sensor 28b. If the detection signal does not indicates that the leading edge of the recording material P arrived, the CPU 301 continues to wait. On the other hand, if the detection signal indicates that the leading edge of the recording material P arrived, the CPU 301 proceeds to step S606.

In step S606, the CPU 301 gives an instruction to stop the rotation of the registration roller pair 26 to the motor control unit 304. The motor control unit 304 stops driving the registration drive motor 305 in accordance with this instruction. This state corresponds to the state shown in FIG. 5A.

In step S607, the CPU 301 executes the light amount adjustment on the LED 315. For example, the CPU 301 gives an instruction to activate the line sensor 25 to the line sensor control unit 302. In accordance with this instruction, the line sensor control unit 302 outputs the clock signal CLK and the start pulse SP to the line sensor 25, and outputs the LED-on signal LED_ON to the LED 315. The line sensor 25 starts outputting the analog output signal OUT in accordance with the clock signal CLK. The CPU 301 receives, from the analog processor 303, the output signal OUT that is constituted by serially arrayed output signals from the device blocks. The CPU 301 adjusts the light amount of the LED 315 so that the output levels of the device blocks that are receiving reflected light from the recording material P are constant. Note that the details of the light amount adjustment are as already discussed using FIGS. 3A and 3B.

In step S608, the CPU 301 gives an instruction to release (separate) the conveyance roller pair 27 to the motor control unit 304. The motor control unit 304 drives the open/close motor 308 so as to open the conveyance roller pair 27, in accordance with this instruction. As a result of the conveyance roller pair 27 being opened, the flexure of the recording material P is resolved, and the skew of the recording material P around its trailing edge is also corrected. In other words, when aforementioned step S607 is executed, correction of the skew around the trailing edge of the recording material P is not complete if the trailing edge of the recording material P has not passed through the conveyance roller pair 27. However, the timing of the light amount correction can be brought forward.

In step S609, the CPU 301 gives an instruction to start the rotation of the registration roller pair 26 to the motor control unit 304. The motor control unit 304 resumes driving the registration drive motor 305 in accordance with this instruction.

In step S610, the CPU 301 determines the threshold value Vth for detecting the side edge position using the threshold value setting unit 313. As already described using FIGS. 3A and 3B, the threshold value setting unit 313 calculates the threshold value Vth from the highest value Vh and the lowest value Vl of the output level of the output signal OUT. Note that the highest value Vh corresponds to the light amount of the reflected light from the recording material P, and the lowest value Vl corresponds to the light amount of the reflected light from the conveyance guide 24. For example, the threshold value setting unit 313 may find the threshold value Vth by adding the highest value Vh and the lowest value Vl to obtain a sum of these values, and further dividing this sum by 2. Note that the method for determining the threshold value Vth is only an example, and other methods may alternatively be employed. This is because the feature of the present embodiment lies in the timing of executing the light amount adjustment. Note that the correction of the skew around the trailing edge of the recording material P is also complete at this point in time. The CPU 301 outputs data indicating the threshold value Vth received from the threshold value setting unit 313 to the D/A converter 309, thereby setting the threshold value Vth in the comparator 310. Thus, the CPU 301 functions as a threshold value determination unit for determining the threshold value Vth for detecting the side edge position from the level (highest value Vh) of the signals output by the light-receiving devices that received light reflected by the recording material P, and from the level (lowest value Vl) of the signals output by the light-receiving devices that did not receive light reflected by the recording material P.

In step S611, the CPU 301 detects the side edge position using the line sensor 25, the counter 311, and the like. As described above, the counter 311 counts the time period during which the level of the output signal OUT exceeds the threshold value Vth, in accordance with the clock signal CLK. This time period corresponds to the side edge position one by one. It is assumed that the correspondence relationship (table, function, data, etc.) between the time (counted value) and the side edge position is also stored in advance in the storage device 320. The counter 311 stops counting at the position where the binary signal output by the comparator 310 switches from the high level to the low level (which may be from the low level to the high level). This counted value indicates the side edge position.

In step S612, the CPU 301 determines the amount of correction of the side edge position (shift amount of the registration roller pair 26) from the detected side edge position. For example, the CPU 301 obtains the misalignment amount α of the detected side edge position relative to the target position. The CPU 301 converts the misalignment amount α into the number of drive pulses (shift amount) of the shift motor 306. It is assumed that a function, table, or a program for converting the misalignment amount α into the pulse number is stored in the storage device 320.

In step S613, the CPU 301 gives an instruction to drive the shift motor 306 with the determined shift amount (pulse number) to the motor control unit 304. The motor control unit 304 drives the shift motor 306 by the pulse number designated through the instruction from the CPU 301. Note that the pulse number is assumed to include data on a symbol that indicates the rotation direction of the shift motor 306. Note that the motor control unit 304 sends a completion signal to the CPU 301 upon completing driving of the shift motor 306.

In step S614, the CPU 301 determines whether or not the leading edge of the recording material P arrived at the transfer sensor 28*c*, based on the detection signal output by the transfer sensor 28*c*. If the detection signal does not indicate that the leading edge of the recording material P arrived, the CPU 301 continues to wait. On the other hand, if the detection signal indicates that the leading edge of the recording material P arrived, the CPU 301 proceeds to step S615.

In step S615, the CPU 301 determines whether or not processing for shifting the registration roller pair 26 (lateral registration correction) was complete. The CPU 301 determines that the shift processing was complete if it received a completion signal from the motor control unit 304, and finishes processing according to this flowchart. On the other hand, if the CPU 301 has not received the completion signal from the motor control unit 304, it determines that the shift processing is not complete, and proceeds to step S616.

In step S616, the CPU 301 displays a message indicating that a jam of the recording material P occurred, on the display device in the operation unit 5. If the shift processing is not complete even though the leading edge of the recording material P arrived at the transfer sensor 28*c*, the side edge position of the recording material P does not agree with the target position. If the toner image is transferred onto the recording material P in this state, the toner image is transferred at a position that is misaligned from an ideal position, and the recording material P is wasted. To prevent it, the CPU 301 regards this state of the recording material P as a jam, executes jam display, and causes the motor control unit 304 to stop driving of all rollers.

According to the present embodiment, the two conveyance rollers constituting the first conveyance roller pair are separated from each other after the light amount of the light-emitting devices is adjusted, and driving of the second conveyance roller pair is started. In other words, the light amount of the light-emitting devices is adjusted during a time period during which a flexure is formed in the recording material P and skew is corrected. Accordingly, the side edge position of the recording material can be detected in a shorter time even if the conveyance speed of the recording material P is raised and the size of the recording material P becomes smaller.

Modification

In the above-described embodiment, the light amount adjustment is uniformly executed before a flexure is resolved, not depending on the size of the recording material P. However, the accuracy of the light amount adjustment improves when the light amount adjustment is executed in a state where the recording material P is flat without a flexure, compared with when the light amount adjustment is executed in a state where the recording material P is flexed.

Here, the passage time taken for the recording material P to pass through the detection position of the line sensor 25 is in proportion to the size of the recording material P (length in the conveyance direction). In the case of the recording material P whose length is relatively short, such as a postcard or a business card, sufficient time for the side edge position detection including the light amount adjustment cannot be ensured, as mentioned above. On the other hand, in the case of the recording material P whose length is relatively long, such as the A4 size, sufficient time for the side edge position detection including the light amount adjustment can be ensured. This is because the passage time is longer in the case of the recording material P whose length is relatively long, such as the A4 size.

The feature of the modification lies in that the timing of executing the light amount adjustment is changed in accordance with the length of the recording material in the conveyance direction. For example, the CPU 301 executes the light amount adjustment before resolving a flexure for the recording material P whose size is smaller than a predetermined size, and executes the light amount adjustment after resolving a flexure for the recording material P whose size is the predetermined size or larger. Accordingly, sufficient processing time can be ensured for the recording material P whose size is smaller than the predetermined size, and the accuracy of the light amount adjustment can be improved for the recording material P whose size is the predetermined size or larger.

Figure 7:
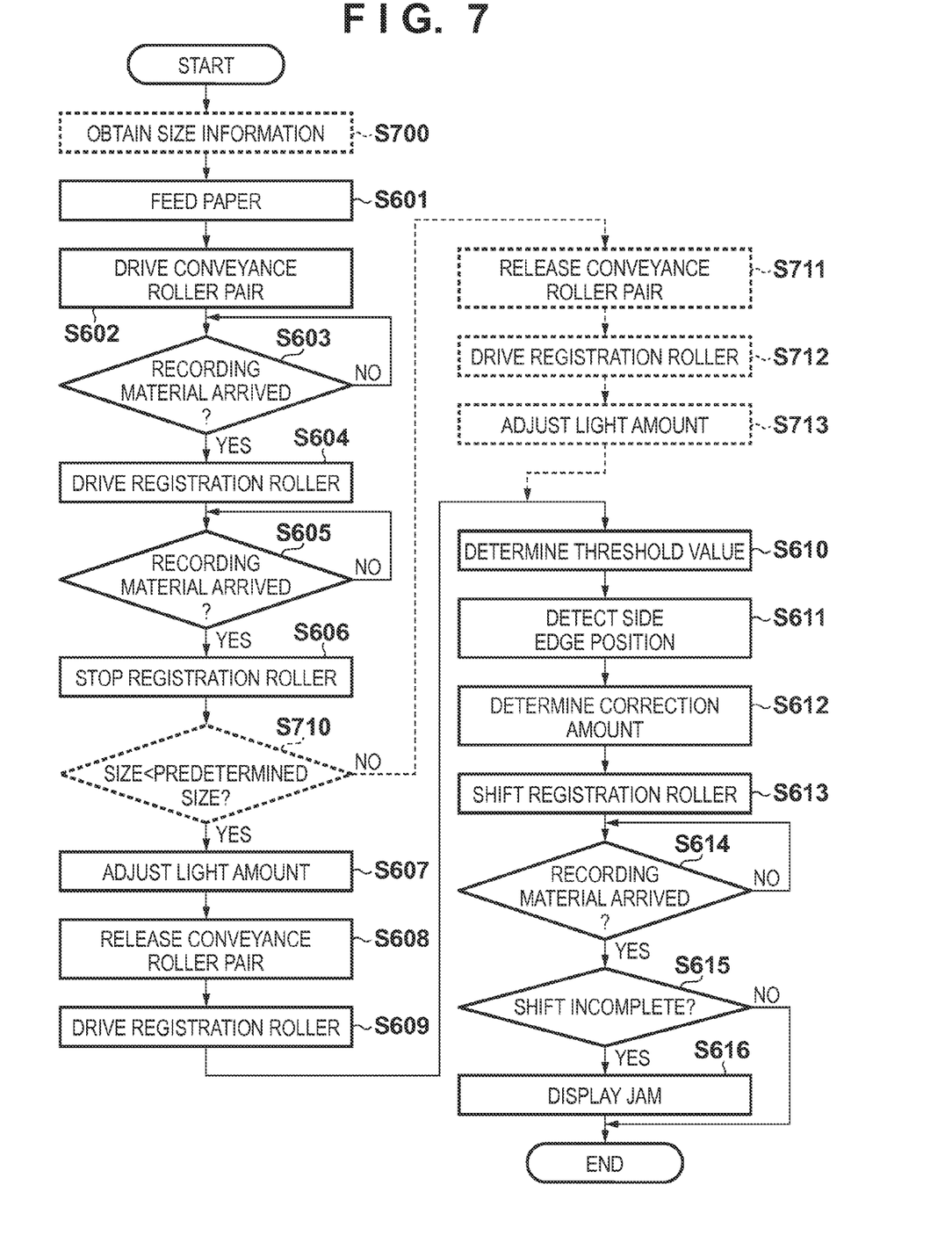
FIG. 7 is a flowchart showing lateral registration correction.

The lateral registration correction executed by the CPU 301 according to the modification will be discussed using FIG. 7. Note that processes in FIG. 7 that are the same as those in FIG. 6 are given the same reference numerals for the sake of simplification of the description.

In step S700, the CPU 301 obtains size information on the recording material P. For example, the CPU 301 obtains size information that indicates the size of the recording material P (e.g., A4, A4R, postcard, business card) from the operation unit 5 or the size sensor 314. Thus, the operation unit 5 and the size sensor 314 are an example of an obtaining unit for obtaining the size information indicating the size of the sheet material. Thereafter, aforementioned steps S601 to S606 are executed, and processing proceeds to step S710.

In step S710, the CPU 301 determines whether or not the size of the recording material P indicated by the size information is smaller than the predetermined size. If the size of the recording material P is smaller than the predetermined size, the CPU 301 proceeds to step S607 and executes the light amount adjustment before the flexure is resolved. On the other hand, if the size of the recording material P is larger than or equal to the predetermined size, the CPU 301 proceeds to step S711.

In step S711, the CPU 301 gives an instruction to release (separate) the conveyance roller pair 27 to the motor control unit 304. The motor control unit 304 drives the open/close motor 308 so as to open the conveyance roller pair 27, in accordance with this instruction. As a result of the conveyance roller pair 27 being opened, the flexure of the recording material P is resolved, and the skew of the recording material P around its trailing edge is also corrected.

In step S712, the CPU 301 gives an instruction to start the rotation of the registration roller pair 26 to the motor control unit 304. The motor control unit 304 resumes driving the registration drive motor 305 in accordance with this instruction.

In step S713, the CPU 301 executes the light amount adjustment on the LED 315. This light amount adjustment is the same process as step S607. After completing the light amount adjustment, the CPU 301 proceeds to step S610. Steps S610 to S616 are as already described.

As described above, the feature of the modification lies in that the timing of executing the light amount adjustment is changed in accordance with the length of the recording material in the conveyance direction. The CPU 301 executes the light amount adjustment before a flexure is resolved for the recording material P whose size is smaller than the predetermined size, and executes the light amount adjustment after a flexure is resolved for the recording material P whose size is the predetermined size or larger. Accordingly, sufficient processing time can be ensured for the recording material P whose size is smaller than the predetermined size, and the accuracy of the light amount adjustment can be improved for the recording material P whose size is the predetermined size or larger.

Other Modifications

Incidentally, the above embodiment was described as one in which the line sensor 25 detects the light amount of reflected light from the recording material P. However, the line sensor 25 may detect the light amount of transmitted light (amount of blocked light) by arranging the LED 315 and the line sensor 25 so as to be opposed to each other and causing the recording material P to pass through between the LED 315 and the line sensor 25. In this case, the CPU 301 can determine, as the threshold value Vth, a median value between the light amount (highest value Vh) of direct light that was not blocked by the recording material P and the light amount (lowest value Vl) of light that was transmitted through the recording material P. The output signal at this time is the output signal from the device block corresponding to the side edge position, as in the above embodiment.

Method for Determining Predetermined Size

Figure 8:
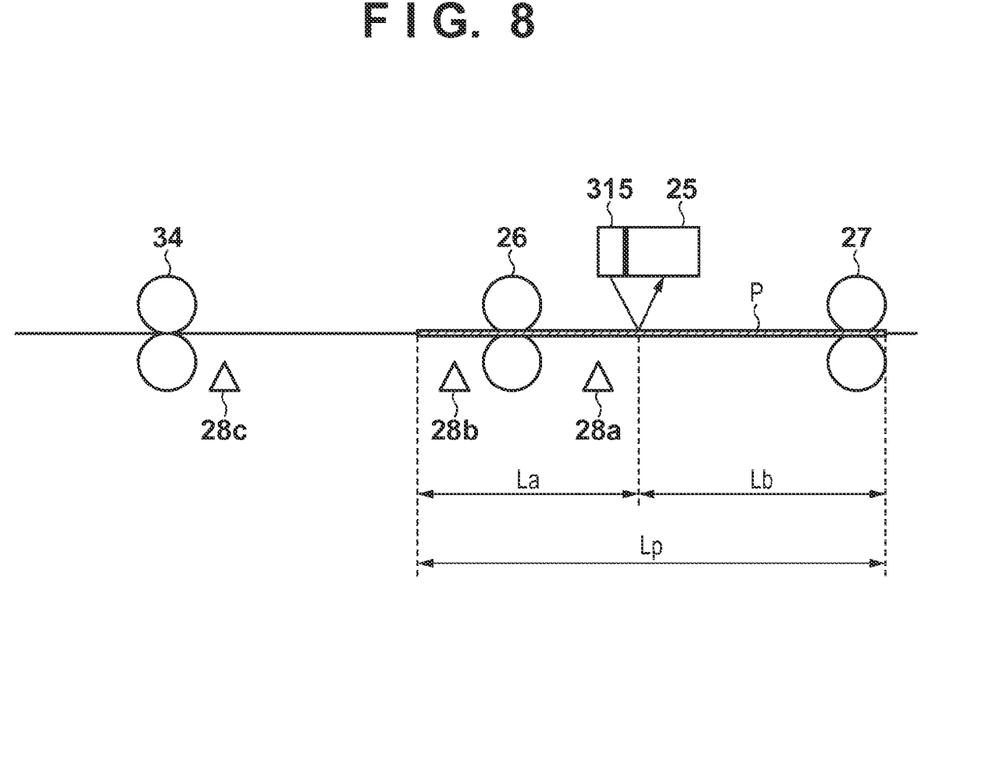
FIG. 8 is a diagram illustrating a predetermined size.

The predetermined size of the recording material P, which is the threshold value used in step S710, will be discussed using FIG. 8. Here, for the sake of convenience, the predetermined size is defined as the length of the recording material P in the conveyance direction. FIG. 8 shows a state in step S606 where the rotation of the registration roller pair 26 is stopped.

Here, Lp denotes the overall length of the recording material P in the conveyance direction. La denotes the distance from the leading edge of the recording material P to the detection position of the line sensor 25. Lb indicates the distance from the detection position to the trailing edge of the recording material P.

$$Lp = La + Lb \quad \text{Eq. 1}$$

Here, adjustment time taken for the light amount adjustment is defined as Tp. The time taken for the trailing edge of the recording material P to finish passing through the detection position after the rotation of the registration roller pair 26 is resumed is defined as passage time t. In this case, if the passage time Tp is longer than the adjustment time Tp, the light amount adjustment can be executed after the rotation of the registration roller pair 26 is resumed (i.e., after a flexure is resolved).

$$t > Tp \quad \text{Eq. 2}$$

t can be calculated from the following expression.

$$t = Lb/v \quad \text{Eq. 3}$$

v denotes the conveyance speed of the recording material P. Here, for the sake of simplification, a conveyance speed v is assumed to be a certain constant value. Here, the following expression is obtained by substituting Eq. 3 and Eq. 1 in Eq. 2 and arranging the expression.

$$Lp > v \cdot Tp + La \quad \text{Eq. 4}$$

Here, v, Tp, and La are values that do not depend on the size of the recording material P and are determined by the performance of the conveyance device. Thus, v·Tp+La is a value indicating the predetermined size. This value is determined in the factory and stored in advance in the storage device 320. The CPU 301 compares the length of the recording material P in the conveyance direction obtained by the size sensor 314 with the predetermined size (v·Tp+La). Note that if the size such as A4, postcard, or business card is designated from the operation unit 5, the CPU 301 may execute comparison processing after converting the designated size into the length in the conveyance direction using a conversion table stored in the storage device 320.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-098241, filed Apr. 23, 2012 which is hereby incorporated by reference herein in its entirety.

What is claimed is:

1. A method of controlling a sheet conveying conveyance device having a first conveyance roller pair with rollers that abut to nip a sheet for conveyance on a conveyance path and that separate from one another, a laterally movable second conveyance roller pair that is arranged downstream of the first conveyance roller pair in a conveyance direction of the sheet to correct skew of the sheet when the sheet abuts the second conveyance roller pair, and a position detection unit that includes a plurality of light-emitting devices and a plurality of light-receiving devices, the method comprising the steps of:
conveying a sheet with the first conveyance roller pair such that the sheet arriving at the second conveyance roller pair is flexed to correct skew while the rollers of the first conveyance roller pair remain abutted to nip the sheet;
adjusting the light amount of the light-emitting devices so that a level of signal output by the light-receiving devices is maintained at a constant value while the rollers of the first conveyance roller pair remain abutted and the sheet is flexed, and before the rollers of the first conveyance roller pair are separated;
detecting the position of the side edge of the sheet by the position detection unit after the light amount of the light-emitting devices is adjusted;

separating the rollers of the first conveyance roller pair; and moving the second conveyance roller pair in a lateral direction that is perpendicular to the conveyance direction in accordance with the detected position of the side edge of the sheet.

2. The method according to claim 1, further comprising the step of obtaining size information indicating a size of the sheet in a conveyance direction of the sheet, wherein if the size of the sheet is smaller than a predetermined size, the light amount of the light-emitting devices are adjusted before the rollers of the first conveyance roller pair are separated.

3. The method according to claim 1, wherein the light amount of the light-emitting devices is adjusted so that an output level of a plurality of light-receiving devices that received light reflected by the sheet is a constant value.

4. The method according to claim 1, wherein the light amount of the light-emitting devices is adjusted in a state where conveyance of the sheet by the second conveyance roller pair is stopped.

5. The method according to claim 4, wherein the detection of the position of the side edge of the sheet is in a state where the sheet is being conveyed by the second conveyance roller pair.

6. The method according to claim 4, further comprising the step of determining a threshold value for detecting the position of the side edge of the sheet, based on a level of a signal output by a light-receiving device that received light reflected by the sheet and a level of a signal output by a light-receiving device that did not receive light reflected from the sheet, after the rollers of the first conveyance roller pair separate, wherein the position of the side edge of the sheet is detected by comparing a level of a signal output by each of the light-receiving devices with the determined threshold value.

7. The method according to claim 6, wherein the step of determining a threshold value includes determining the threshold value in a state where the sheet is being conveyed by the second conveyance roller pair.

8. The method according to claim 1, further comprising the step of forming an image on a sheet whose position of the side edge was corrected by movement of the second conveyance roller pair.

9. A method of controlling a sheet conveyance device having a first conveyance roller pair with rollers that abut to nip a sheet for conveyance on a conveyance path and that separate from one another, a laterally movable second conveyance roller pair that is arranged downstream of the first conveyance roller pair in a conveyance direction of the sheet to flex the sheet to correct skew of the sheet when the sheet abuts the second conveyance roller pair, and a position detection unit that includes a plurality of light-emitting devices that emit light and a plurality of light-receiving devices that receive light, the method comprising the steps of:

obtaining a size of the sheet in the conveyance direction;

conveying a sheet by the first conveyance roller pair such that the sheet arriving at the second conveyance roller pair is flexed to correct skew of the sheet;

adjusting the light amount of the light emitting devices;

detecting the position of the side edge of the sheet in the lateral direction on the conveyance path between the first conveyance roller pair and the second conveyance roller pair;

separating the rollers of the first conveyance roller pair; and moving the second conveyance roller pair in accordance with the detected position of the side edge after adjustment of the light amount of the light-emitting devices, wherein if the obtained size of the sheet is smaller than a predetermined size, the light amount of the light-emitting devices is adjusted before the first conveyance roller pair which nips the flexed sheet is separated, and if the obtained size of the sheet is the predetermined size or larger, the light amount of the light-emitting devices is adjusted after the first conveyance roller pair which nips the flexed sheet is separated.

* * * * *